Sept. 5, 1933. H. J. MUEHR 1,925,456
HEN'S NEST
Filed July 22, 1929
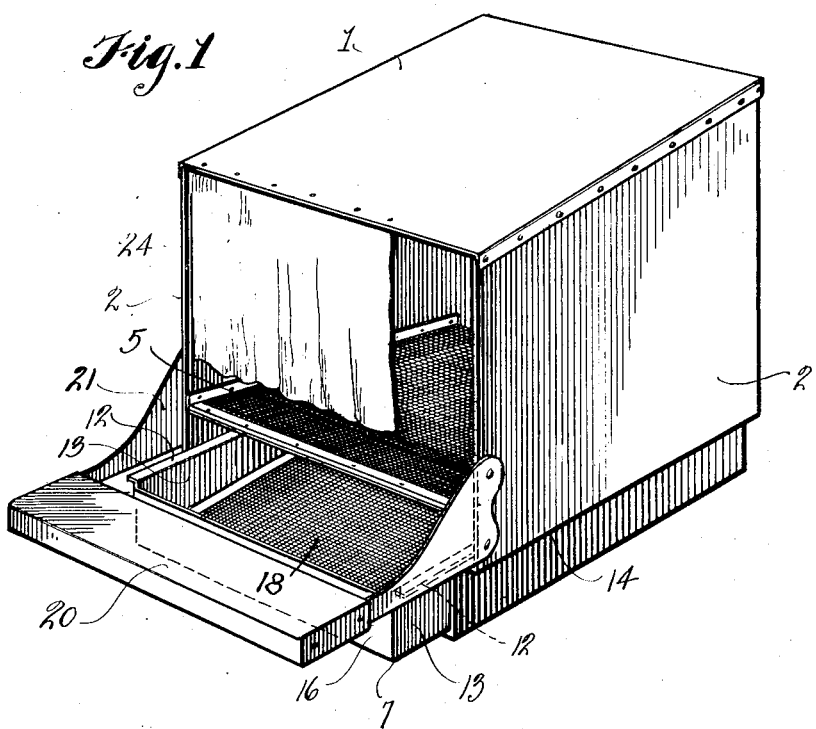
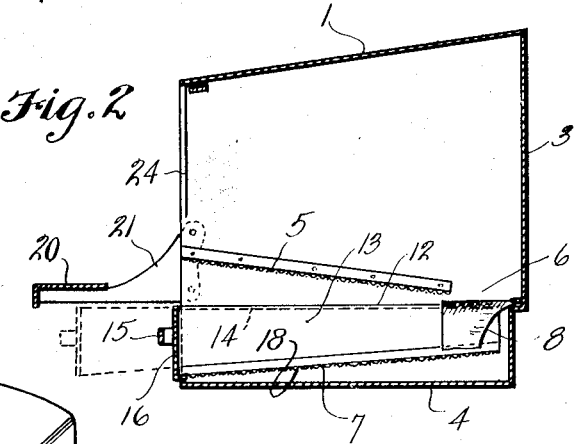
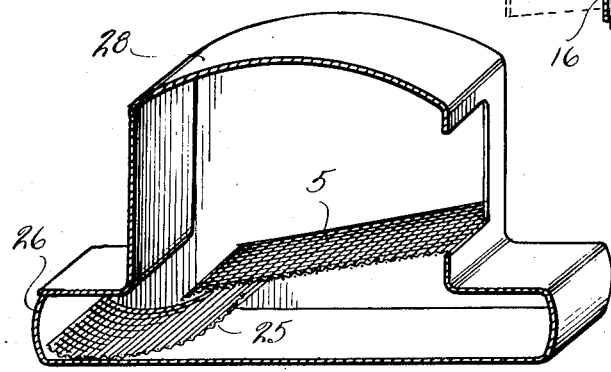
INVENTOR
H. JOSEPH MUEHR
BY
Cook & Robinson
ATTORNEY Patented Sept. 5, 1933

1,925,456

UNITED STATES PATENT OFFICE 1,925,456

HEN'S NEST

Herman Joseph Muehr, Lake Bay, Wash.

Application July 22, 1929. Serial No. 380,123

1 Claim. (Cl. 119—48)

This invention relates to improvements in hens' nests and has for its principal objects to provide a nest that will insure clean eggs and will prevent breakage of the eggs by hens in entering or leaving the nest. Also, to provide a nest that is sanitary, durable, easily cleaned and relatively inexpensive.

More specifically stated, the present invention resides in the provision of a nest employing an inclined surface across which the egg, when laid by the hen, will roll into a receptacle, by means of which the eggs may be easily and readily removed.

Other objects of the invention reside in the various details of construction and in the combination of parts as will hereinafter be described.

In accomplishing these and other objects of the invention, I have provided the improved details of construction, two forms of which are illustrated in the accompanying drawing, wherein—

Fig. 1 is a perspective view of a nest embodying the present invention.

Fig. 2 is a sectional view of the same, particularly illustrating the inclination of the nest floor and of the drawer in which the eggs are received.

Fig. 3 is a sectional detail of a nest of alternative form of construction.

Referring more in detail to the drawing:

In a preferred form of construction, the nest consists of a rectangular box-like housing constructed of metal or any other suitable material and provided with a forwardly inclined top wall 1, parallel opposite side walls 2—2, a vertical rear wall 3 and a horizontal bottom wall 4. The front of the housing is open to provide access to and from the nest, which is formed by a screen wire floor panel 5 that is fixed at its opposite edges to the opposite walls 2—2 of the housing, and is inclined downwardly toward the rear wall of the housing but which terminates at a short distance forwardly of the rear wall so as to provide a passage, as designated at 6 in Fig. 2, of sufficient width for the passage of eggs into a receptacle in the form of a basket 7 that is removably contained within the base portion of the housing below the panel 5. As is best shown in Fig. 2, a cushioning cloth 8 is attached about the side walls of the passage 6 and across the end of the basket against which the eggs, when delivered from the nest, will drop. This pad eliminates any possibility of breakage of eggs in passing from the nest into the basket and it may be extended to overlie the sides of the basket if this is thought necessary.

Catch basket 7 is of drawer-like construction and is arranged to be drawn outwardly from beneath the nest for removal of the eggs therefrom. It is slidably supported by outwardly turned flanges 12 along the top edges of its side walls 13. These flanges rest upon shoulders or shelves 14 that are formed horizontally in the opposite side walls 2—2 below the nest panel. A handle 15 may be attached to the front end wall 16 of the basket so that it may be easily withdrawn. It is to be noted that there is no rear end wall in the basket and this permits the basket to be extended beyond the pad 8. It is also to be noted that the bottom wall 18 of the basket is inclined forwardly so that the eggs when delivered thereto from the nest will roll to the front end of the basket. This places the eggs in a position for easy removal and also insures that they will not remain at the rear end of the basket where they might be broken by eggs dropping from the nest.

At the front end of the nest is a platform 20 supported at its ends by brackets 21 that are fixed to and extend forwardly from the side walls. This platform is arranged so that hens may step from it into the nest. It is also spaced sufficiently forward from the box that the basket may be withdrawn for removal of the eggs.

There is also provided a cloth curtain 24 part way across the front of the nest box to darken the nest. This curtain terminates a little above the forward edge of the panel 5 so that the hen may easily enter or leave the nest. If desired, this curtain may extend to the panel and may be extended entirely across the front opening.

In Fig. 3 I have illustrated an alternative construction in which the nest base 5 slopes to the rear and eggs drop therefrom into the rearwardly inclined mesh panel 25 leading into a rearward extension 26 of the box. In this alternative form the housing may be constructed of metal shaped so as to form a platform forwardly of the entrance to the nest and also to form the rearward extension.

With nests so constructed the eggs when laid immediately roll from the nest panel into the receptacle which retains them safely until removed. It also prevents any possibility of an egg being broken by being stepped on by a hen in entering or leaving the nest, and it is an insurance against the eggs being soiled or discolored.

Nests of this character may be built in multiple units or singly, and it is quite apparent that various details of construction may be changed without departing from the spirit of the invention, and it is for this reason that I do not wish the claim which terminates this specification to be confined only to the specific details which are herein illustrated and described.

Having thus described my invention, what I claim is new therein and desire to secure by Letters-Patent, is:

A nest of the character described comprising a housing having a front opening and comprising a base portion and an upper portion, each with opposite side walls; the side walls of the base portion being inset from the side walls of the upper portion and joined with the side walls by horizontal connecting portions forming upwardly facing shoulders within the housing, a panel supported in the housing and inclined rearwardly from said opening and terminating in spaced relation from the rear wall of the housing to provide an egg passage, a receiving receptacle in the nature of a drawer mounted in the housing beneath the inclined panel to receive, at its rear end, eggs delivered from the inclined panel, said drawer having outwardly flanged portions along the top edges of its side walls overlying the said shoulders and slidable thereon; a pad attached to the housing about the rear and side edges of the egg passage and suspending downwardly through the passage and within the drawer in a forwardly inclined position for catching the eggs as they are discharged from the panel to the receptacle and an inclined bottom in the receptacle whereby the eggs will be caused to roll to the forward end.

HERMAN JOSEPH MUEHR.